United States Patent Office 2,819,315
Patented Jan. 7, 1958

2,819,315

5-BENZYLOXY-β,2-DINITROSTYRENES

Merrill E. Speeter, Kalamazoo, Mich., assignor to The Upjohn Company, Kalamazoo, Mich., a corporation of Michigan No Drawing. Application February 23, 1952
Serial No. 273,148

17 Claims. (Cl. 260—612)

The present invention relates to novel organic compounds, and is more particularly concerned with a novel method for the production of 5-benzyloxy-β,2-dinitrostyrenes and with the products thus-produced.

The compounds of the present invention may be represented by the formula:

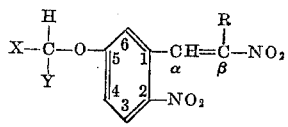

wherein R represents hydrogen or lower-alkyl, X represents phenyl, lower alkoxyphenyl, halophenyl, or lower alkylphenyl, and Y represents hydrogen, phenyl, lower alkoxyphenyl, halophenyl, or lower alkylphenyl.

An object of the present invention is to provide new and useful compounds, the 5-benzyloxy-β,2-dinitrostyrenes. An additional object is the provision of a novel process, employing novel starting compounds, for the preparation of 5-benzyloxy-β,2-dinitrostyrenes. Other objects of the invention will be apparent to those skilled in the art to which the invention pertains.

The novel compounds of the present invention are important intermediates in the preparation of 5-hydroxytryptamine, or more briefly named, serotonin, a compound known to possess powerful vasoconstrictor qualities. The novel compounds of the present invention are also useful in the preparation of styrenated resins and polymers, according to usual procedure for the preparation of such resins or polymers.

Serotonin, or 5-hydroxytryptamine, is prepared by the debenzylation of a 5-benzyloxytryptamine, as more fully disclosed in U. S. Patent 2,708,197. The 5-benzyloxytryptamines are prepared by reduction of the corresponding 5-benzyloxy-3-indoleacetonitrile, in a manner more fully disclosed in U. S. Patent 2,703,325, and the 5-benzyloxy-3-indoleacetonitriles are prepared in a manner more fully disclosed in my co-pending application, Serial Number 257,961, filed November 23, 1951, now Patent 2,728,778, by reaction of 5-benzyloxyindoles with a haloacetonitrile in a Grignard reaction. Preparation of the 5-benzyloxyindoles, as more fuly disclosed in my co-pending application, Serial Number 273,149, filed concurrently herewith, and now abandoned, involves the reductive cyclization of the novel 5-benzyloxy-β,2-dinitrostyrenes of the present invention using powdered iron and an aliphatic acid, such as acetic acid, for example.

According to the method of the present invention the 5-benzyloxy-β,2-dinitrostyrenes are prepared by dehydrating a 5-benzyloxy-2-nitro-α-[1-(1-nitroalkyl)]benzyl alcohol, which may be represented by the formula:

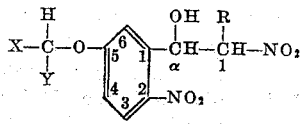

wherein X, Y, and R have the values given above and which are prepared in a manner more fully disclosed in U. S. Patent 2,698,345.

The dehydration of the starting 5-benzyloxy-2-nitro-α-[1-(1-nitroalkyl)]benzyl alcohols to produce 5-benzyloxy-β,2-dinitrostyrenes is preferably accomplished by reacting the starting alcohol with an aliphatic acid anhydride. The 5-benzyloxy-β,2-dinitrostyrenes may thereafter be precipitated by the addition of the solution to water, and subsequently recrystallized to a greater degree of purity from an alcohol, such as ethanol. Suitable acid anhydrides for the reaction include among others the lower-aliphatic acid anhydrides, such as acetic, propionic, butyric, and the like. The dehydration is generally conducted at a temperature of about eighty degrees centigrade, although other temperatures between about fifty and 150 degrees centigrade may also be employed, a somewhat shorter reaction time being required at the higher temperature. Addition to the reaction mixture of an alkali-metal salt of the acid corresponding to the acid anhydride employed is sometimes advantageous. Other conventional procedure may also be utilized for the dehydration, such as the application of heat, use of potassium acid sulfate accompanied by heat, use of oxalic acid or phthalic anhydride, or the use of phosphorus pentoxide and pyridine.

The starting 5-benzyloxy-2-nitro-α-[1-(1-nitroalkyl)] benzyl alcohols are prepared by the condensation of a 5-benzyloxy-2-nitrobenzaldehyde, which is prepared according to the method of Burton [J. Chem. Soc., 1935, 1265] or Portmann and Giovannini Helv. Chim. Acta, 31, 1381 (1948)], dissolved in a suitable solvent such as the lower alkanols, e. g., methanol, propanol, ethanol, isopropanol, or the like, with a 1-nitroalkane in the presence of an alkali-metal hydroxide to produce an alkali-metal salt of the desired nitro alcohol. The nitro alcohol salt is thereupon reacted with an acid to yield the 5-benzyloxy-2-nitro-α-[1-(1-nitroalkyl)]benzyl alcohol. Among the many 1-nitroalkanes which are suitable for the reaction are the following: nitromethane, nitroethane, 1-nitropropane, 1-nitrobutane, 1-nitropentane, 1-nitroheptane, 1-nitrohexane, 1-nitrooctane, 1-nitrononane, and the like. The utilization of nitromethane results in the formation of a 5-benzyloxy-2-nitro-α-nitromethylbenzyl alcohol and dehydration of the alcohol results in the formation of a 5-benzyloxy-β,2-dinitrostyrene. The employment of 1-nitroalkanes, containing from two to nine carbon atoms, inclusive, results in the formation of a 5-benzyloxy-2-nitro-α-[1-(1-nitroalkyl)]benzyl alcohol, wherein the nitroalkyl radical similarly contains from two to nine carbon atoms, inclusive, but dehydration of the latter alcohol results in the formation of a 5-benzyloxy-β,2-dinitro-β-alkylstryene, wherein the alkyl radical in the beta position contains from one to eight carbon atoms, inclusive. Representative alkali-metal hydroxides include potassium hydroxide, sodium hydroxide, lithium hydroxide, rubidium hydroxide, and cesium hydroxide. The reaction is usually conducted between about zero and minus forty degrees centigrade, with minum fifteen degrees centigrade being preferred. After stirring for a period between about one and three hours, production of the alkali-metal salt of the 5-benzyloxy-2-nitro-α-[1-(1-nitroalkyl)]benzyl alcohol is usually complete, and the salt is then converted to the free 5-benzyloxy-2-nitro-α-[1-(1-nitroalkyl)]benzyl alcohol by mixing with a suitable acidifying agent, with or without prior separating of the salt. Such acidifying agent may be an organic acid, e. g., acetic, formic, propionic, butyric, and the like, carbon dioxide, or an inorganic acid such as sulfuric, hydrochloric, hydrobromic, or the like. When organic acids, or carbon dioxide, are employed as acidifying agents, the alcohol may be recovered by adding the reaction mixture, usually after stirring, to a large quantity of water, stirring, filtering to remove the precipitated alcohol, and recrystallizing from alcohol-water. When an inorganic acid is employed as the acidifying agent, the product is a mixture of the 5 - benzyloxy - 2-nitro-α-[1-(1-nitroalkyl)]benzyl alcohol and the corresponding 5-benzyloxy-β,2-dinitrostyrene. The acidification in such case is usually conducted by adding an inorganic acid to the alcohol salt, adding water, extracting the liberated oil with a solvent such as ether, benzene, chloroform, toluene, or ethylene dichloride, or the like, with ether being preferred, drying and concentrating the solution, and separating the 5-benzyloxy - 2 - nitro-α-[1-(1-nitroalkyl)]benzyl alcohol therefrom. Other suitable isolation procedures may be employed and are known in the art. One method of separation of the alcohol from the styrene involves, e. g., adding the reaction product, after drying and concentrating, to about three volumes of a boiling solvent such as a lower alkanol, e. g., ethanol, boiling for an additional period, e. g., about five minutes, and filtering to remove the relatively insoluble 5-benzyloxy-β,2-dinitrostyrene. Additional 5-benzyloxy-β,2-dinitrostyrene may be removed by cooling the filtrate, as in an ice bath, and again filtering to remove additional quantities of 5-benzyloxy-β,2-dinitrostyrene. The filtrate, containing the 5-benzyloxy-2-nitro-α-[1-(1-nitroalkyl)]benzyl alcohol, may then be added to a large quantity of water, and the resulting mixture extracted with a solvent such as ether, chloroform, or benzene, with ether being preferred. After concentration of the solvent extracts, as in a vacuum, the 5-benzyloxy-2-nitro-α-]1-(1-nitroalkyl)]benzyl alcohol may be crystallized from solution by the addition of a solvent such as methylcyclohexane, toluene, ethyl acetate, or alcohol-water, and recovered by filtration.

The 5-benzyloxy-2-nitro-α-[1-(1-nitroalkyl)]benzyl alcohols thus-produced are then dehydrated according to the method of the present invention. Alternatively, the mixture of 5-benzyloxy-2-nitro-α-[1-(1-nitroalkyl)]benzyl alcohol and 5-benzyloxy-β,2-dinitrostyrene, obtained by acidification of the alcohol salt using an inorganic acid, may be reacted directly without isolation of the components thereof in the dehydration process of the present invention.

The following examples will serve to illustrate the process and products of this invention, but the said invention is not to be considered as limited thereto.

PREPARATION 1.—5-BENZYLOXY-2-NITRO-α-NITROMETHYLBENZYL ALCOHOL

A solution of 64.3 grams (0.25 mole) of 5-benzyloxy-2-nitrobenzaldehyde, in 1300 milliliters of ethanol and 75 milliliters of water was chilled to minus fifteen degrees centigrade in a Dry Ice-alcohol bath. To the chilled solution was added 24 grams (0.394 mole) of nitromethane, with addition immediately thereafter of a slow stream of a solution of 33 grams of 85 percent potassium hydroxide in 500 milliliters of ethanol and fifty milliliters of water. The potassium salt of the nitro alcohol separated as a finely divided solid within thirty to 45 minutes, the reaction mixture was stirred for an additional hour, and immediately thereafter sixty grams of acetic acid was added in a slow stream, cooling bath removed, and three liters of cold water added thereto. An additional thirty grams of acetic acid was added and the solution stirred for an additional hour until the nitro alcohol had solidified and was dispersed as small granules, whereupon the nitro alcohol was filtered, washed thoroughly with cold water and dried. The yellow 5-benzyloxy-2-nitro-α-nitromethylbenzyl alcohol weighed 79.5 grams and melted at 93–96 degrees centigrade. A sample recrystallized from alcohol-water melted at 97–98 degrees centigrade.

PREPARATION 2.—5-BENZYLOXY-2-NITRO-α-NITROMETHYLBENZYL ALCOHOL

A solution of twenty grams (0.077 mole) of 5-benzyloxy-2-nitrobenzaldehyde and 7.5 grams (0.12 mole) of nitromethane in 600 milliliters of 95 percent ethanol was cooled in an ethanol-Dry Ice bath to minus fifteen degrees centigrade, and to the cooled solution was added 11.5 grams of potassium hydroxide in 200 milliliters of ethanol with constant stirring. Stirring was continued for an additional hour thereafter at a temperature between minus ten and minus fifteen degrees centigrade. The cold mixture was acidified with dilute hydrochloric acid, whereupon all solids dissolved. The resulting mixture was poured into two liters of water, resulting in separation of an oil, which was extracted with four 200-milliliter portions of ether. The combined extracts were dried and concentrated, and added to sixty milliliters of boiling ethanol. The resulting solution was heated for an additional three minutes and the relatively insoluble 5-benzyloxy-β,2-dinitrostyrene recovered by filtration. Upon cooling the filtrate to room temperature, the filtrate was cooled in an ice bath for three hours, whereupon an additional quantity of 5-benzyloxy-β,2-dinitrostyrene crystallized and was removed by filtration. The remaining 5-benzyloxy-2-nitro-α-nitromethylbenzyl alcohol solution was added to two liters of water and the mixture extracted with three 200-milliliter portions of ether. The combined extracts were dried and concentrated under a vacuum of fifty millimeters of mercury pressure. The 5-benzyloxy-2-nitro-α-nitromethylbenzyl alcohol contained in the concentrate was recrystallized by the addition of 75 milliliters of toluene. Upon filtering, the recovered 5-benzyloxy-2-nitro-α-nitromethylbenzyl alcohol weighed 8.7 grams and melted at 97–98 degrees centigrade.

Other representative 5 - benzyloxy - 2 - nitrobenzaldehydes which may be employed as starting compounds in the process of the preceding preparations include the following: 5-alkylbenzyloxy-2-nitrobenzaldehydes, e. g., 5-(para - methylbenzyloxy)-2-nitrobenzaldehyde, 5-(para-ethylbenzyloxy)-2-nitrobenzaldehyde, and the like; 5-alkoxybenzyloxy-2-nitrobenzaldehydes, e. g., 5-(para-methoxybenzyloxy)-2-nitrobenzaldehyde, 5-(para-ethoxybenzyloxy)-2-nitrobenzaldehyde, and the like; 5-halobenzyloxy)-2-nitrobenzaldehydes, e. g., 5-(para-chlorobenzyloxy)-2-nitrobenzaldehyde, and the like; 5-benzhydryloxy - 2 - nitrobenzaldehyde; 5-dihalobenzhydryloxy-2-nitrobenzaldehydes, e. g., 5-(para,para'-dichlorobenzhydryloxy)-2-nitrobenzaldehyde, and the like; 5-dialkylbenzhydryloxy-2-nitrobenzaldehydes, e. g., 5-(para,para'-dimethylbenzhydryloxy)-2-nitrobenzaldehyde, and the like; 5-dialkoxybenzhydryloxy-2-nitrobenzaldehydes, e. g., 5-(para,para' - dimethoxybenzhydryloxy) - 2-nitrobenzaldehyde, and the like.

Other representative 5-benzyloxy-2-nitro-α-[1-(1-nitroalkyl)]benzyl alcohols which are thus prepared, by reacting the selected 1-nitroalkane and the chosen 5-benzyloxy-2-nitrobenzaldehyde, are, e. g., 5-benzyloxy-2-nitro-α-[1-(1-nitroethyl)]benzyl alcohol, 5-benzyloxy-2-nitro-α-[1-(1-nitropropyl)]benzyl alcohol, 5-benzyloxy-2-nitro - α-[1-(1-nitrononyl)]benzyl alcohol; 5-alkylbenzyloxy-2-nitro-α-[1-(1-nitroalkyl)]benzyl alcohols, e. g., 5-(para-methylbenzyloxy) - 2-nitro-α-nitromethylbenzyl alcohol, 5 - (para-methylbenzyloxy)-2-nitro-α-[1-(1-nitroethyl)]benzyl alcohol; 5-alkoxybenzyloxy-2-nitro-α-[1-(1-nitroalkyl)]benzyl alcohols, e. g., 5-(para-methoxybenzyloxy)-2-nitro-α-nitromethylbenzyl alcohol, 5-(para-methoxybenzyloxy) - 2 - nitro-α-[1-(1-nitroethyl)]benzyl alcohol; 5 - halobenzyloxy - 2-nitro-α-[1-(1-nitroalkyl)] benzyl alcohols, e. g., 5-(para-chlorobenzyloxy)-2-nitro-α-nitromethylbenzyl alcohol, 5-(para-chlorobenzyloxy)-2 - nitro-α-[1-(1-nitroethyl)]benzyl alcohol; 5-benzhydryloxy-2-nitro-α-[1-(1-nitroalkyl)]benzyl alcohols, e. g., 5-benzhydryloxy-2-nitro-α-nitromethylbenzyl alcohol, 5-benzhydryloxy-2-nitro-α-[1-(1-nitropropyl)]benzyl alcohol; 5 - dihalobenzhydryloxy - 2 - nitro - α-[1-(1-nitroalkyl)]benzyl alcohols, e. g., 5-(para,para'-dibromobenzhydryloxy) - 2-nitro-α-[1-(1-nitrohexyl)]benzyl alcohol, 5 - (para,para' - dichlorobenzhydryloxy)-2-nitro-α-nitromethylbenzyl alcohol; 5-dialkylbenzhydryloxy-2-nitro-α-[1-(1-nitroalkyl)]benzyl alcohols, e. g., 5-(para,para'-dimethylbenzhydryloxy)-2-nitro-α-nitromethylbenzyl alcohol, 5-(para,para'-diethylbenzhydryloxy)-2-nitro-α-[1-(1-nitropropyl)]benzyl alcohol; 5-dialkoxybenzhydroyloxy-2-nitro-α-[1-(1-nitroalkyl)]benzyl alcohols, e. g., 5-(para-para'-dimethoxybenzhydryloxy)-2-nitro-α-nitromethylbenzyl alcohol, 5-(para,para'-dipropoxybenzhydryloxy)-2-nitro-α-[1-(1-nitrobutyl)]benzyl alcohol, and the like.

*Example 1.—5-benzyloxy-β,2-dinitrostyrene*

A mixture of 79.5 grams (0.25 mole) of 5-benzyloxy-2-nitro-α-nitromethylbenzyl alcohol, twenty-five grams of anhydrous sodium acetate, and 250 milliliters of acetic anhydride was heated on a steam bath with occasional stirring for about thirty minutes. Crushed ice was then added to the solution with occasional stirring until the mixture cooled and 5-benzyloxy-β,2-dinitrostyrene began to separate, whereafter the mixture was additionally cooled in an ice bath, two liters of ice water added thereto, and the mixture again stirred for approximately half an hour. The 5-benzyloxy-β,2-dinitrostyrene separated and was filtered and further purified by suspending in 500 milliliters of ethanol, refluxing for about ten minutes, filtering and washing with 100 milliliters of hot ethanol. Upon drying in air, the 5-benzyloxy-β,2-dinitrostyrene weighed sixty grams (eighty percent yield) and melted at 147–148 degrees centigrade.

*Example 2.—5-benzyloxy-β,2-dinitrostyrene*

A solution of twenty grams (0.077 mole) of 5-benzyloxy-2-nitrobenzaldehyde and 7.5 grams (0.12 mole) of nitromethane in 600 milliliters of 95 percent ethanol was cooled in an ethanol-Dry Ice bath to minus fifteen degrees centigrade. To the cooled solution was added 11.5 grams of potassium hydroxide in 200 milliliters of ethanol with constant stirring, and the stirring was continued for an additional hour thereafter at a temperature between minus ten and minus fifteen degrees centigrade. The cold mixture was acidified with dilute hydrochloric acid, whereupon all solids dissolved. The resulting mixture was poured into two liters of water, resulting in the separation of an oil. The oil was extracted with four 200-milliliter portions of ether and the combined extracts dried and concentrated. The residual mixture of nitroalcohol and nitrostyrene was warmed on a steam bath for about fifteen minutes with 75 milliliters of acetic anhydride and twenty grams of anhydrous sodium aceate, and then poured into 300 milliliters of water, whereupon 5-benzyloxy-β,2-dinitrostyrene separated. The separated product was removed by filtration. Upon recrystallizing from ethanol, eighteen grams (77 percent) of 5-benzyloxy-β,2-dinitrostyrene, melting at 146 to 147 degrees centigrade, was obtained.

*Analysis.*—Percent calculated for $C_{15}H_{12}N_2O_5$: C, 59.99; H, 4.02; N, 9.33. Found: C, 59.92; H, 4.10; N, 9.25.

*Example 3.—5-benzyloxy-β,2-dinitro-β-methylstyrene*

In essentially the same manner as disclosed in Examples 1 and 2, 5-benzyloxy-β,2-dinitro-β-methylstyrene is prepared by dehydrating 5-benzyloxy-2-nitro-α-[1-(1-nitroethyl)]benzyl alcohol with acetic anhydride.

In the same manner the following are prepared by dehydration of the appropriate 5-benzyloxy-2-nitro-α-[1-(1-nitroalkyl)]benzyl alcohol: 5-benzyloxy-β,2-dinitro-β-ethylstyrene, 5-benzyloxy-β,2-dinitro-β-propylstyrene, 5-benzyloxy-β,2-dinitro-β-butylstyrene, 5-benzyloxy-β,-dinitro-β-amylstyrene, 5-benzyloxy-β,2-dinitro-β-hexylstyrene, 5-benzyloxy-β,2-dinitro-β-heptylstyrene, 5-benzyloxy-β,2-dinitro-β-octylstyrene, and the like.

*Example 4.—5-benzhydryloxy-β,2-dinitro-β-ethylstyrene*

In essentially the same manner as disclosed in Examples 1 and 2, 5-benzhydryloxy-β,2-dinitro-β-ethylstyrene is prepared by dehydrating 5-benzhydryloxy-2-nitro-α-[1-(1-nitropropyl)]benzyl alcohol with oxalic acid.

In the same manner other 5-benzhydryloxy-β,2-dinitro-β-alkyl styrenes are prepared by dehydration of the appropriate 5-benzhydryloxy-2-nitro-α-[1-(1-nitroalkyl)]benzyl alcohol, e. g., 5-benzhydryloxy-β,2-dinitro-β-propylstyrene, 5-benzhydryloxy-β,2-dinitro-β-hexylstyrene, and the like.

*Example 5.—5-(para,para'-dimethoxybenzhydryloxy)-β,2-dinitrostyrene*

In essentially the same manner as disclosed in Examples 1 and 2, 5-(para,para'-dimethoxybenzhydryloxy)-β,2-dinitrostyrene is prepared by dehydrating 5-(para,para'-dimethoxybenzhydryloxy)-2-nitro-α-nitromethylbenzyl alcohol with acetic anhydride and anhydrous sodium acetate.

In the same manner other 5-alkoxybenzyloxy-β,2-dinitrostyrenes are prepared by dehydration of the appropriate 5-alkoxybenzyloxy-2-nitro-α-[1-(1-nitroalkyl)]benzyl alcohol, e. g., 5-(para-ethoxybenzyloxy)-β,2-dinitrostyrene, 5-(para-ethoxybenzyloxy)-β,2-dinitro-β-methylstyrene, 5-(para,para'-dipropoxybenzhydryloxy)-β,2-dinitro-β-propylstyrene, and the like.

*Example 6.—5-benzhydryloxy-β,2-dinitrostyrene*

In essentially the same manner as disclosed in Examples 1 and 2, 5-benzhydryloxy-β,2-dinitrostyrene is prepared by dehydrating 5-benzhydryloxy-2-nitro-α-nitromethylbenzyl alcohol with acetic anhydride.

*Example 7.—5-(para,para'-dimethylbenzhydryloxy)-β,2-dinitrostyrene*

In essentially the same manner as disclosed in Examples 1 and 2, 5-(para,para'-dimethylbenzhydryloxy)-β,2-dinitrostyrene is prepared by dehydrating 5-(para,para'-dimethylbenzhydryloxy)-2-nitro-α-nitromethylbenzyl alcohol with acetic anhydride and anhydrous sodium acetate.

In the same manner other 5-alkylbenzyloxy-β,2-dinitrostyrenes are prepared by dehydration of the corresponding 5-alkylbenzyloxy-2-nitro-α-[1-(1-nitroalkyl)]benzyl alcohol, e. g., 5-(meta,meta'-diethylbenzhydryloxy)-β,2-dinitro-β-ethylstyrene, 5-(para-propylbenzyloxy)-β,2-dinitrostyrene, 5-(para-methylbenzyloxy)-β,2-dinitro-β-methylstyrene, and the like.

*Example 8.—5-(para,para'-dichlorobenzhydryloxy)-β,2-dinitrostyrene*

In essentially the same manner as disclosed in Examples 1 and 2, 5-(para,para'-dichlorobenzhydryloxy)-β,2-dinitrostyrene is prepared by dehydrating 5-(para,para'-dichlorobenzhydryloxy)-2-nitro-α-nitromethylbenzyl alcohol with phthalic anhydride.

In the same manner other 5-halobenzyloxy-β,2-dinitrostyrenes are prepared by dehydrating the corresponding 5-halobenzyloxy-2-nitro-α-[1-(1-nitroalkyl)]benzyl alcohol, e. g., 5-(para,para'-dibromobenzhydryloxy)-β,2-dinitro-β-amylstyrene, 5-(para-chlorobenzyloxy)-β,2-dinitrostyrene, 5-(para-iodobenzyloxy)-β,2-dinitro-β-propylstyrene, and the like.

It is to be understood that this invention is not to be limited to the exact details of operation or exact compounds shown and described, as obvious modifications and equivalents will be apparent to one skilled in the art and the invention is therefore to be limited only by the scope of the appended claims.

I claim:

1. In a process for the preparation of a 5-benzyloxy-β,2-dinitrostyrene, the step of removing water from the molecule of a 5-benzyloxy-2-nitro-α-[1-(1-nitroalkyl)]benzyl alcohol by causing said 5-benzyloxy-2-nitro-α-[1-(1-nitroalkyl)]benzyl alcohol to react with a dehydrating agent to produce a 5-benzyloxy-β,2-dinitrostyrene.

2. In a process for the preparation of a 5-benzyloxy-β,2-dinitrostyrene, the step of removing water from the molecule of a 5-benzyloxy-2-nitro-α-[1-(1-nitroalkyl)]-benzyl alcohol having the formula:

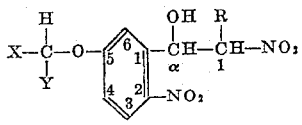

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and R is selected from the group consisting of hydrogen and lower alkyl, by causing said 5-benzyloxy-2 - nitro - α - [1 - (1 - nitroalkyl)]benzyl alcohol to react with a dehydrating agent to produce a 5-benzyloxy-β,2-dinitrostyrene.

3. In a process for the preparation of 5-benzyloxy-β,2-dinitrostyrene, the step of removing water from the molecule of 5-benzyloxy-2-nitro-α-nitromethylbenzyl alcohol by causing said 5-benzyloxy-2-nitro-α-nitromethylbenzyl alcohol to react with a dehydrating agent to produce 5-benzyloxy-β,2-dinitrostyrene.

4. In a process for the preparation of 5-benzhydryloxy-β,2-dinitrostyrene, the step of removing water from the molecule of 5-benzhydryloxy-2-nitro-α-nitromethylbenzyl alcohol by causing said 5-benzhydryloxy-2-nitro-α-nitromethylbenzyl alcohol to react with a dehydrating agent to produce 5-benzhydryloxy-β,2-dinitrostyrene.

5. In a process for the preparation of 5-benzyloxy-β,2-dinitrostyrene, the step of removing water from the molecule of 5-benzyloxy-2-nitro-α-nitromethylbenzyl alcohol by causing said 5-benzyloxy-2-nitro-α-nitromethylbenzyl alcohol to react with acetic anhydride to produce 5-benzyloxy-β,2-dinitrostyrene.

6. In a process for the preparation of 5-benzhydryloxy-β,2-dinitrostyrene, the step of removing water from the molecule of 5-benzhydryloxy-2-nitro-α-nitromethylbenzyl alcohol by causing said 5-benzhydryloxy-2-nitro-α-nitromethylbenzyl alcohol to react with acetic anhydride to produce 5-benzhydryloxy-β,2-dinitrostyrene.

7. In a process for the preparation of a 5-benzyloxy-β,2-dinitrostyrene, the steps of condensing a 5-benzyloxy-2-nitrobenzaldehyde with a 1-nitroalkane in the presence of an alkali-metal hydroxide, acidifying the salt thus-produced with an acid, and dehydrating the product thus-produced with acetic anhydride to yield a 5-benzyloxy-β,2-dinitrostyrene.

8. In a process for the preparation of a 5-benzyloxy-β,2-dinitrostyrene, the steps of condensing a 5-benzyloxy-2-nitrobenzaldehyde, having the formula:

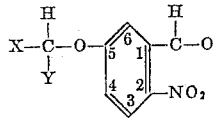

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, with a 1-nitroalkane in the presence of an alkali-metal hydroxide, acidifying the salt thus produced with an acid to produce a 5-benzyloxy-2-nitro-α-[1-(1-nitroalkyl)]benzyl alcohol, and dehydrating the alcohol thus produced with acetic anhydride to yield a 5-benzyloxy-β,2-dinitrostyrene.

9. In a process for the preparation of 5-benzyl-β,2-dinitrostyrene, the steps of condensing 5-benzyloxy-2-nitrobenzaldehyde with nitromethane in the presence of an alkali-metal hydroxide, acidifying the salt thus-produced with an acid, and dehydrating the product thus produced with acetic anhydride to yield 5-benzyloxy-β,2-dinitrostyrene.

10. In a process for the preparation of 5-benzhydryloxy-β,2-dinitrostyrene, the steps of condensing 5-benzhydryloxy-2-nitrobenzaldehyde with nitromethane in the presence of an alkali-metal hydroxide, acidifying the salt thus produced with an acid, and dehydrating the product thus produced with acetic anhydride to yield 5-benzhydryloxy-β,2-dinitrostyrene.

11. In a process for the preparation of a 5-benzyloxy-β,2-dinitrostyrene, the steps of condensing a 5-benzyloxy-2-nitrobenzaldehyde with a 1-nitroalkane in the presence of an alkali-metal hydroxide, acidifying the salt thus produced with an organic acid, and dehydrating the product thus produced with acetic anhydride to yield a 5-benzyloxy-β,2-dinitrostyrene.

12. In a process for the preparation of a 5-benzyloxy-β,2-dinitrostyrene, the steps of condensing a 5-benzyloxy-2-nitrobenzaldehyde with a 1-nitroalkane in the present of an alkali-metal hydroxide, acidifying the salt thus produced with an inorganic acid, and dehydrating the mixture thus produced with acetic anhydride to yield a 5-benzyloxy-β,2-dinitrostyrene.

13. A 5-benzyloxy-β,2-dinitrostyrene.

14. A 5-benzyloxy-β,2-dinitrostyrene having the formula:

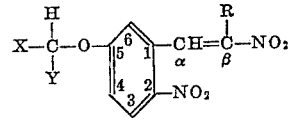

wherein X is selected from the group consisting of phenyl, halophenyl, lower alkoxyphenyl, and lower alkylphenyl, Y is selected from the group consisting of hydrogen, phenyl, halophenyl, lower alkoxyphenyl, and lower alkylphenyl, and R is selected from the group consisting of hydrogen and lower alkyl.

15. A 5-benzhydryloxy-β,2-dinitrostyrene.

16. 5-benzhydryloxy-β,2-dinitrostyrene.

17. 5-benzyloxy-β,2-dinitrostyrene.

References Cited in the file of this patent

UNITED STATES PATENTS

| | | |
|---|---|---|
| 2,601,282 | Heinzelmann | June 24, 1952 |
| 2,698,345 | Speeter | Dec. 28, 1954 |

OTHER REFERENCES

Kanao: J. Pharm. Soc. (Japan), No. 550, p. 1020; see Chem. Abst., vol. 22, pp. 1588–89 (1928).

Beilstein: Handbuch der Organischen Chemis, 4th ed., vol. 6 (1931), p. 278.

Spath et al.: Chem. Abstracts, vol. 28 (1934), col. 5826, 7 (2 pages).

Hass et al.: Chem. Reviews, vol. 22, pp. 406–410, June 1943.

Ginsburg: Chem. Abstracts, vol. 45 (1951), col. 625, 6 (2 pages).